(12) United States Patent
Ward (10) Patent No.: US 11,043,770 B2
(45) Date of Patent: Jun. 22, 2021

(54) CABLE RELEASE DEVICE

(71) Applicant: JDR Cable Systems Ltd., Littleport Ely (GB)

(72) Inventor: Philip Allan Ward, Littleport Ely (GB)

(73) Assignee: JDR Cable Systems Ltd., Ely (GB)

( * ) Notice: Subject to any disclaimer, the term of this patent is extended or adjusted under 35 U.S.C. 154(b) by 0 days.

(21) Appl. No.: 16/579,616

(22) Filed: Sep. 23, 2019

(65) Prior Publication Data

US 2020/0099161 A1 Mar. 26, 2020

(30) Foreign Application Priority Data

Sep. 26, 2018 (GB) ..................................... 1815720

(51) Int. Cl.
*H01R 13/502* (2006.01)
*H01R 13/622* (2006.01)
*H01R 13/64* (2006.01)

(52) U.S. Cl.
CPC ......... *H01R 13/502* (2013.01); *H01R 13/622* (2013.01); *H01R 13/64* (2013.01)

(58) Field of Classification Search
CPC .................................................. H01R 13/502
See application file for complete search history.

(56) References Cited

U.S. PATENT DOCUMENTS

| | | | |
|---|---|---|---|
| 5,050,302 A * | 9/1991 | Mills | G02B 6/245 30/90.4 |
| 9,391,434 B2 * | 7/2016 | Allen | H02G 1/1297 |
| 2015/0050822 A1 | 2/2015 | MacAllister | |

\* cited by examiner

*Primary Examiner* — Ross N Gushi
(74) *Attorney, Agent, or Firm* — Stetina Brunda Garred and Brucker (57) ABSTRACT

A cable breakaway device for use with a power cable connector and a power cable, the power cable connector comprising a sheath and a bearing surface. The cable breakaway device comprising a body with an elongate channel passing therethrough, one or more sharp protrusions radially extending from the body to cut the sheath as the cable is pulled through the channel, allowing the bearing surface to engage the breakaway device without impeding the movement of the connecting device.

14 Claims, 7 Drawing Sheets

CABLE RELEASE DEVICE

CROSS REFERENCE TO RELATED APPLICATIONS

The present application claims priority to United Kingdom Application No. 1815720.6 filed Sep. 26, 2018, the entirety of the disclosure of which is expressly incorporated herein by reference.

STATEMENT RE: FEDERALLY SPONSORED RESEARCH/DEVELOPMENT

Not Applicable.

FIELD OF THE INVENTION

This invention relates to a power cable connector emergency breakaway device.

BACKGROUND OF THE INVENTION

Offshore floating structures, such as a wind turbine, are typically un-manned and held in position using mooring lines to anchor the floating structure to the seabed. External electrical power cables may then be connected to the power cores on the deck of the floating structure via connectors whereby, the connectors generally are of a T shaped design and interlock with each other to provide a rotationally adjustable routing position. Alternatively, cable connections have been made by hard wiring the electrical cables into a junction box, which are generally large in size, or by using elongate coupled connectors that can be mated and de-mated quickly. However, the coupled connectors have the drawback in that they cannot be de-mated whist hot due to the internal expanding of the connection ring that connects the electrical cables to the coupled connectors. Before the external electrical power cables can be coupled to the deck power cores, the cables are passed through an I- or J-tube which is integrally mounted to the floating structure. These tubes are commonly used to provide a structurally stable platform for guiding cables to be passed through the tube, whereby the tube offers structural support for mounting and terminating the cables to structures such as an offshore floating structure. Once the cables have been terminated, via an I- or J-tube, they can then be coupled to the deck power cores via suitable connectors.

In the event of a mooring line failure, for example due to a storm or a collision between a floating structure or vessel, severe localised damage can be done to both the floating structure and the integrally mounted tubes by the load from the connected, external electrical power cables. If the securing structure is unable to release the electrical power cables from the deck power cores or whatever connection is provided to the structure, then significant damage may be done to elements of the tubes and or supporting structure some of which may be difficult and/or expensive to repair on site. For example, floating structures that use cast concrete with cast in steel mounting points.

Such structures tend to have mechanisms in place to ensure the release of cables under extreme conditions or in emergency situations. The cables are typically connected and supported by hang-off assemblies which carry the mechanical load of the cable whilst allowing the cables to be connected electrically to other components without significant mechanical load bearing function.

However, in an emergency situation, the mechanical loads may become such that managed separation of the cable from the structure is desirable. In these situations, the hang-off assembly may include components which are designed to fail to release the main attachment point for the cable from the structure. However, the cable may be terminated in an electrical connector for providing the connection to the deck power cores and these connections may provide a significant mechanical connection too. This may prevent the release of the cable from the structure. This can be particularly exacerbated when the connections are under electrical load which can lead to higher mechanical coupling strength due to the expansion of connection elements such as the loaded spring or expanding ring. The loaded spring, or expanding ring, acts as an electrical interface between a cable and a connector and, under a high current load expands such that the loaded spring, or expanding ring, locks the connector and cable together, preventing the connector from releasing the cable. If the electrical connector is sufficiently strong, it may prevent the separation of the power cables from the structure which can lead to the damage mentioned above. This damage can be difficult, time consuming and expensive to repair offshore especially compared to the cost of re-instating the electrical power cable if it is released as desired by the release mechanism.

The present invention aims to overcome or at least ameliorate one or more of the problems set out above.

SUMMARY OF THE INVENTION

According to the present invention, there is provided a cable breakaway system for use with a power cable connector provided on a power cable, the power cable connector having an outer insulating sheath provided around the outer circumference of at least a part of the connector into which the cable is received, and a bearing surface within the sheath, the cable breakaway system including at least one cable breakaway device comprising: a main body having a channel passing therethrough for receiving at least a part of a power cable; and at least one cutting protrusion extending away from the main body, wherein movement of the power cable in a first direction through the channel causes the power cable connector to move towards the cable breakaway device such that the sheath of the connector engages the at least one cutting protrusion of the breakaway device, cutting the sheath and allowing the bearing surface to move toward and subsequently make contact with a portion of the main body.

Preferably, the power cable connector further comprises a lug mounted to the bearing surface, wherein the body of the cable breakaway device can contact either the lug or the bearing surface to release the power cable from the connector. In this way, the power cable breakaway device can be used with a variety of power cable connectors that comprise lugs of differing shapes and sizes. Depending on the size of the lug, the upper lip of the cable breakaway device is able to contact either the lug or the bearing surface of a power cable connector to release the power cable from a floating structure.

Advantageously, the sharp protrusions are a pair of cutting blades and are pivotally mounted to the body of the cable breakaway device such that a power core of the power cable may pass through the channel of the breakaway device without binding. This allows simpler and safer installation of the breakaway device as the cutting blades do not catch the body of a power core being passed through the breakaway device during installation.

Favourably, the protrusions and particularly the cutting blades are coated with a low shore hardness polymeric material to aid in preventing corrosion of the cutting blade material and to prevent inadvertent cutting or injury during handling.

Preferably, the cutting blades are hooked to help in constraining and directing the radially displaced electrical stress sleeve and rubber body of the power cable connector into the blade edges of the cutting blades to ensure reliable cutting.

Advantageously, a plurality of cutting blades may be radially mounted about the centre axis of the elongate channel. Here, the use of additional cutting blades allows the cable breakaway device to cut the sheath in several places to ensure the sheath does not engage the breakaway device and reduce the impact of the coble connector bearing surface on the breakaway device.

Favourably, the power cable can be disconnected in both an energised and non-energised state. In this way, no prior planning and/or preparation is required for the disconnection of a power cable from a floating structure using the cable breakaway device allowing for a vastly more flexible and safer power cable release protocol.

Preferably, the pulling of the power cable in a first direction to separate the electrical connection can be done manually to allow remote controlled disconnection of the power cable. The pre-emptive ability to release a power cable from a floating structure allows potential damage to the floating structure, by an impending dangerous event, to be mitigated. This may be achieved by initiating the separation of the cable from the structure by separating the hang-off element in s similar way to separation under extreme conditions. The initiation may be done by mechanically separating the hang-off elements so that the mechanical load on the cable is transferred to the electrical connections.

Advantageously, the body of the cable breakaway device is cylindrical to facilitate the stripping of the electrical stress sleeve and rubber body layers of the power cable connector. More preferably, the upper portion, at the end where the sheath meets the breakaway device may be tapered. The tapered body aids in guiding the displaced layers into the cutting blades.

A plurality of cable breakaway devices may be used with a plurality of power cable connectors and power cores, and the plurality of power cores may vary in length such that when the power cable is pulled in a first direction, the power cores connected to the power cable connectors engage the cable breakaway devices sequentially so that they are released in a cascading manner Releasing the power cores in a cascading manner ensures that each power core can be pulled through the hang-off assembly without becoming entangled which may obstruct and/or stop the cable release process.

In a second aspect of the invention, there is provided a method for a method for disconnecting a power cable from a power cable connector having a sheath and a bearing surface within the sheath, the method comprising: directing at least a portion of the cable through a channel in a cable breakaway device for connection to a power cable connector; drawing the cable through the channel in a direction away from the connector, to cause the sheath of the cable connector to engage one or more cutting protrusions, provided on the outer surface of a breakaway device, to cut the sheath such that the sheath is displaced as the cable is drawn; further drawing the cable until the sheath is displaced sufficiently to allow the bearing surface to engage the cable breakaway device preventing relative movement of the bearing surface and cable breakaway device; and continuing to draw the cable until the cable is separated from the power cable connector.

Favourably, the method further comprises a hang-off assembly having a fixed portion and a detachable portion connected to and supported by the fixed portion by a shear pin, wherein the power cable is connected to the detachable portion to support the power cable, the method comprising: inducing a load between the fixed portion and the detachable portion to cause the shear pin to fail due to the induced load, such that the detachable portion becomes separated from and unsupported by the fixed portion; and allowing the detachable portion to move away from the fixed portion, drawing the cable through the hang-off assembly such that at least a portion of the cable is drawn through the channel as a result of the load in the cable due to the separation of the detachable portion from the fixed portion. In this way, the floating structure can be evacuated or be left unmanned whilst still allowing activation of the separation mechanism.

BRIEF DESCRIPTION OF THE DRAWINGS

Specific embodiments of the invention will now be described in detail by reference to the attached drawings in which-.

DETAILED DESCRIPTION

An embodiment of the invention is described below. This would typically be used with floating structures that need to be connected to an external power connection for the transmission and/or receipt of electrical power. Under some circumstances such structures may require an electrical power cable connection to be rapidly released from the structure such as during a storm or collision event. A typical floating structure layout that might utilise an embodiment of the invention will now be described.

Figure 1:
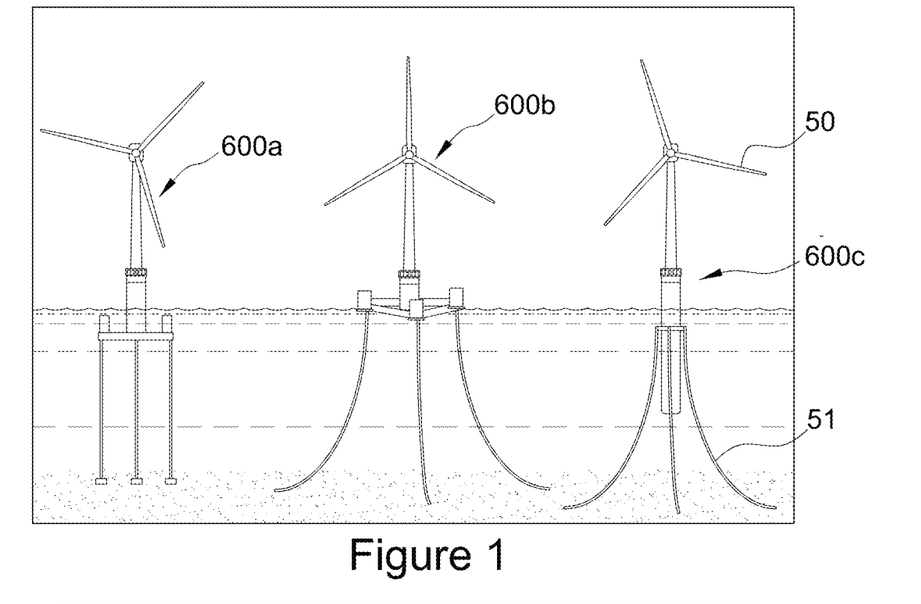
FIG. 1 is a schematic view of typical types of floating structures.
Figure 2:
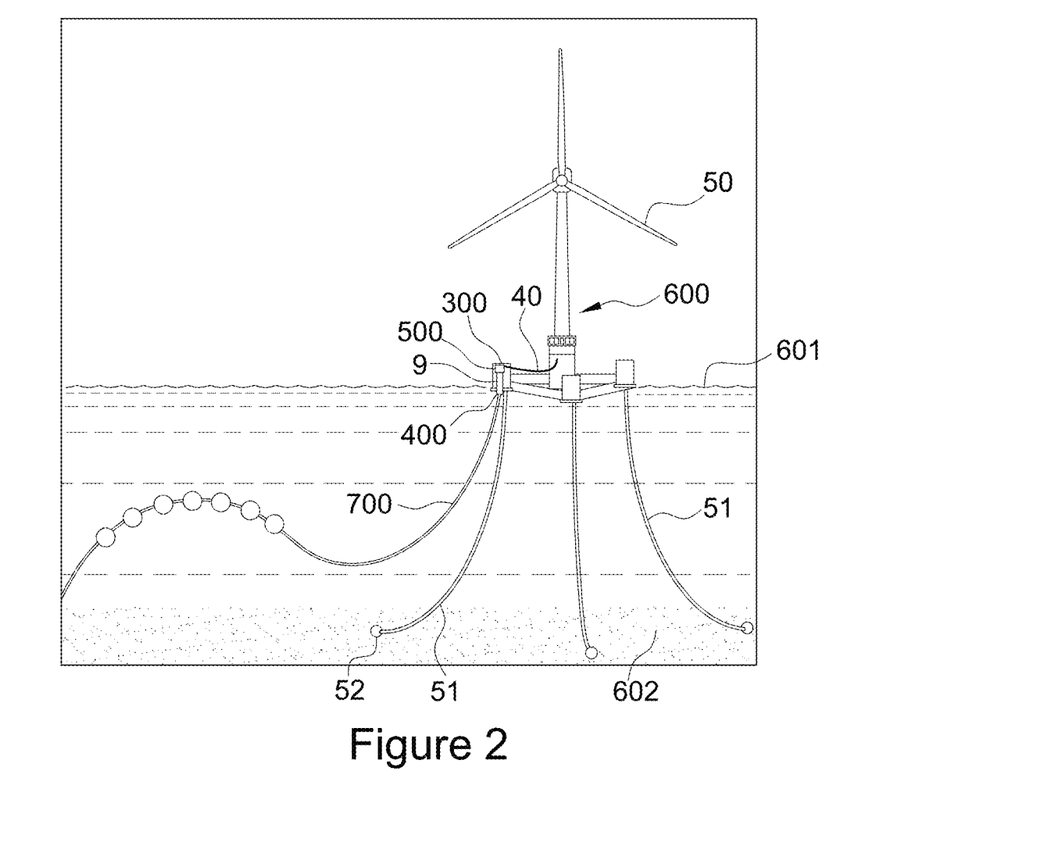
FIG. 2 is a schematic view of a general floating structure layout.

FIG. 1 shows examples of typical floating structures 600a, 600b, 600c. FIG. 2 shows a floating structure 600 arranged to float on a sea surface 601 and comprises a turbine 50 and mooring lines 51. The mooring lines 51 are used to hold the floating structure 600 in place by using the anchors 52 to anchor the mooring lines 51 to the seabed 602. The floating structure 600 further comprises a tube 9 and deck power cores 40; the tube 9 allows the passage of a power cable 700 which connects to the deck power cores 40. The power cable 700 enters the tube 9 via a latch assembly 400 (see FIG. 3) and is mounted to the top of the tube 9 by a hang-off assembly 500.

Figure 5:
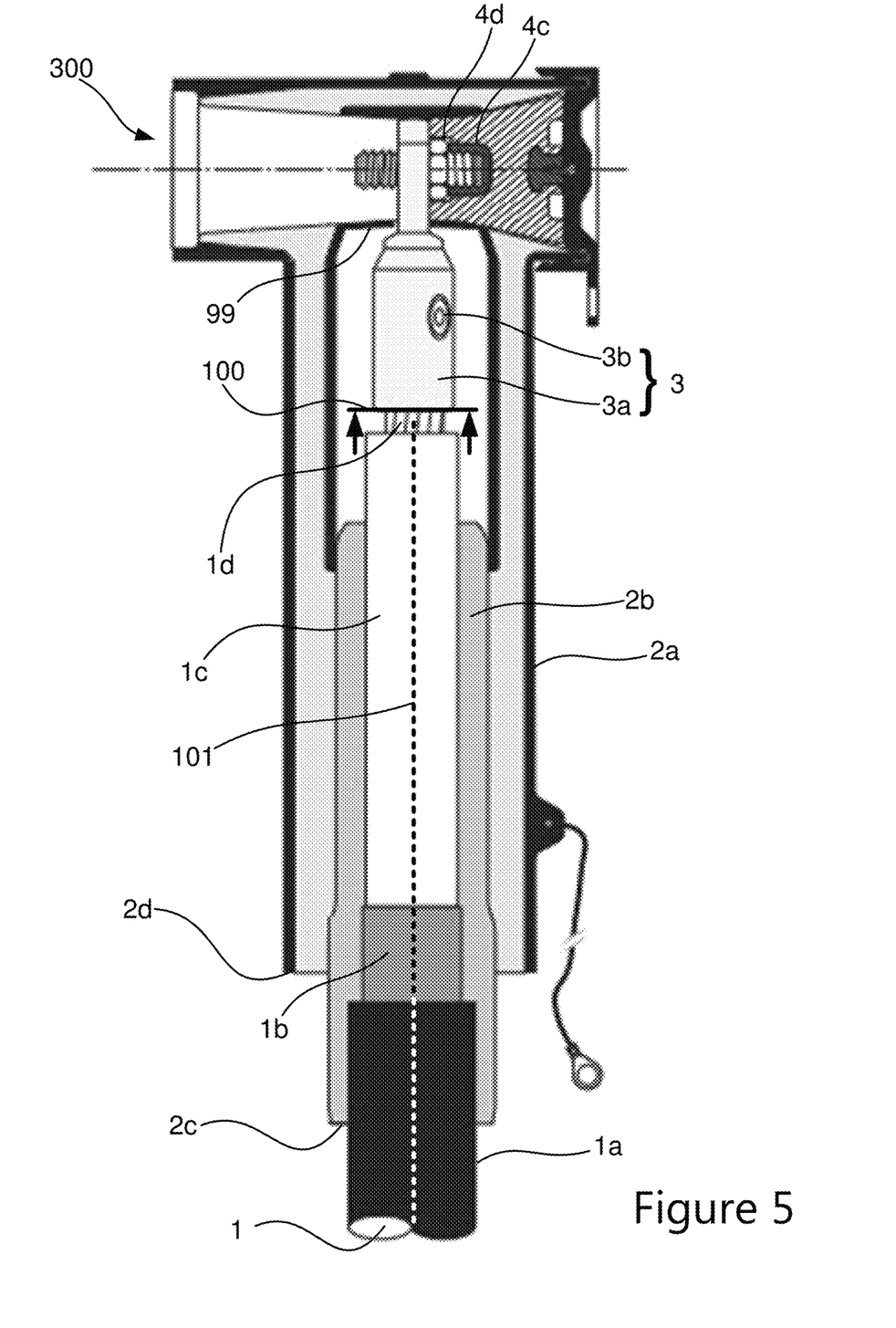
FIG. 5 is cross sectional view of a power cable connector.

Once the power cable 700 has been mounted using the hang-off assembly 500, the individual power cores 1 within the power cable 700 are exposed and are subsequently connected to the deck power cores 40 via multiple power cable connectors 300; one connector 300a, 300b, 300c for each power core 1 (see FIG. 7). The power cable connectors 300 (see FIG. 5) comprise a T-shaped rubber body 2a with an electrical stress sleeve 2b and a terminal 3 such that a conductor core 1d of a power core 1 of the power cable 700 can be terminated to allow the transfer of electrical power between the power cable 700 and the deck power cores 40 of the floating structure 600. The power core 1 comprises an outer sheath layer 1a, an insulation screen layer 1b and an insulation layer 1c which envelope the conductor core 1d. The conductor core 1d passes through the electrical stress sleeve 2b, is terminated in the lug 3a, and secured by the shear bolt 3b. The lug 3a is mounted within the power cable connector 300 using the mounting stud 4c and mounting nut 4d via the bearing surface 99. An embodiment of the power cable connector breakaway device will now be described.

Figure 6:
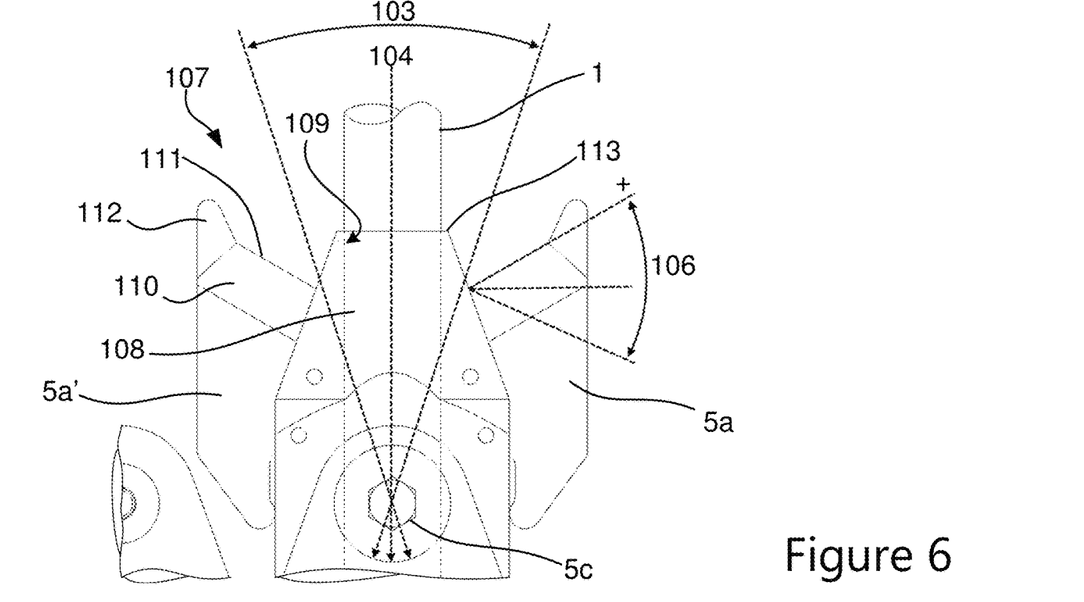
FIG. 6 is a schematic view of the general layout of the power cable connector breakaway device.

With reference to FIG. 6, the power cable connector breakaway device 107 comprises a main body 108 with a cylindrical portion and a tapered section. Cutting blades (5a, 5a') extend radially from, and are mounted directly to, the exterior surface of the main body. A straight elongate channel 109 passes through the main body 108 along the centre axis 104 to provide an aperture through which a power core 1 can be passed. A body pivot 5c is integrally mounted to the wall of the main body 108 such that it does not obstruct the passage of the channel 109. In this way, the main body 108 is able to pivot about the body pivot 5c along a pivotal direction 103 to allow the power core 1 to pass through the channel 109 of the main body 108 without inadvertently binding to the cutting blades (5a, 5a'). The pivotal ability of the main body 108 also allows the power core 1 to be pulled along its natural pull line without being obstructed.

The cutting blades (5a, 5a') comprise an upper portion 110 that converges to a blade edge 111. The top of the upper portion 110 is inclined such that the blade edge 111 of each upper portion 110 is inclined towards the main body 108. In the example of FIG. 6, the blade angle 106 of the cutting blades (5a, 5a') is tilted towards the main body 108 relative to the horizontal. In other embodiments, different blade angles may be used to achieve a similar cutting effect.

This may include tilting the blade edge 111 away from the main body 108. In some embodiments, the main body 108 may comprise more than two cutting blades (5a, 5a') such that a wider variety of power cable connector materials may be cut using the additional cutting potential of the extra cutting blades. In other embodiments, there may only be a single cutting blade as to simplify the design of the power cable connector breakaway device 107.

Figure 7:
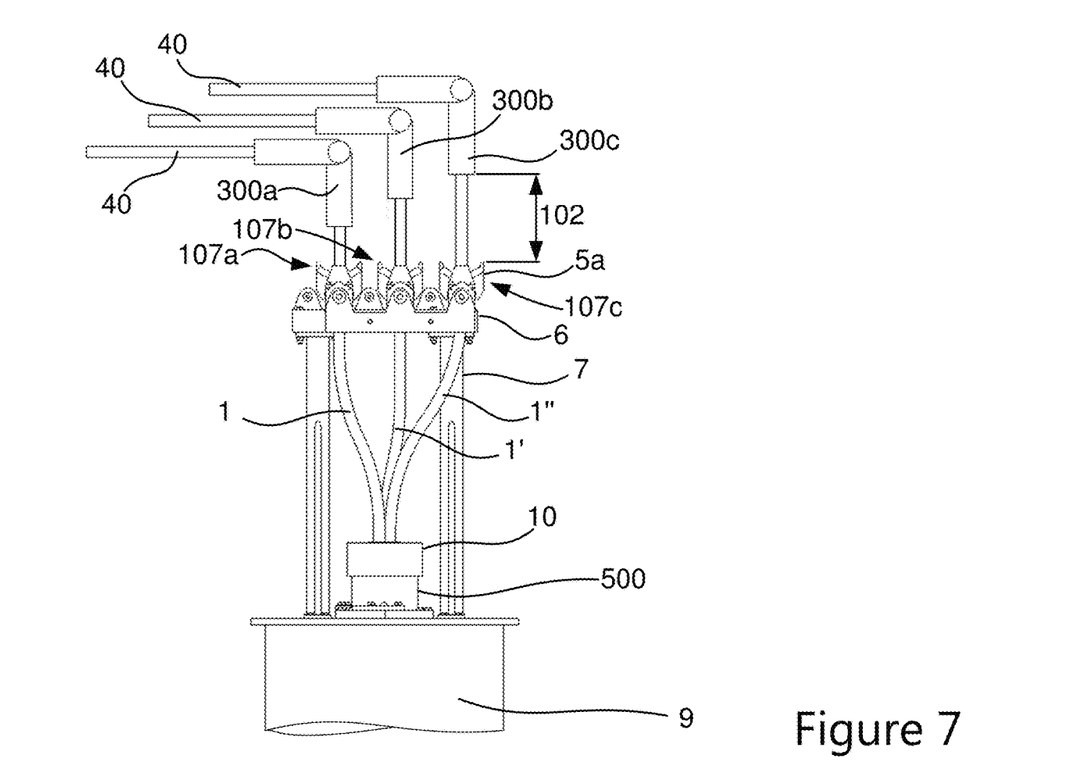
FIG. 7 is a schematic view of the power cable connector breakaway system.

With reference to FIG. 7, a plurality of power cable connector breakaway devices 107 are mounted onto a support frame 7, via a support beam 6, provided on the top of the tube 9. As described above, separate power cores 1, 1', 1" are passed through their corresponding power cable connector breakaway devices 107a, 107b, 107c and then, connected to their corresponding power cable connectors 300a, 300b, 300c. Under normal operating conditions, the cable is supported, and no significant downward tension is placed on the power cable 700, such that the power cores 1 remain connected to the power cable connectors 300 and electrical power is able to be transferred between the deck power cores 40 and the power cable 700.

Figure 8:
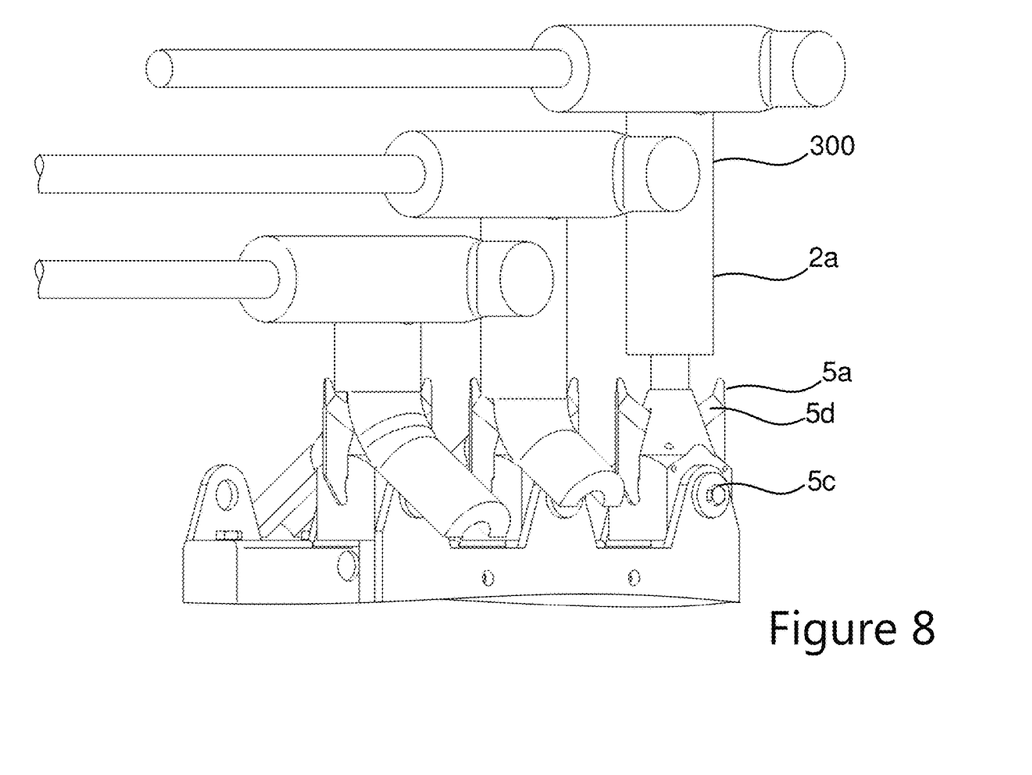
FIG. 8 is a schematic view of the power cable connector breakaway device during operation.

With reference to FIG. 8, the operation of the release mechanism under excessive load conditions is shown. When excessive tension is placed on the power cable 700, the power cores 1 are pulled which in turn pull the connected power cable connectors 300 in the same direction as the power cable 700 along the pull line 101 (shown in FIG. 5), towards the power cable connector breakaway device 107. As the power cable 700 is pulled, the power core 1 is pulled through the power cable connector breakaway device 107. The electrical stress sleeve 2b has a lower rim 2c (see FIG. 5) which extends radially from the power core 1. As the power core is pulled downwards, the lower rim 2c makes contact with the upper lip 113 of the main body 108.

Excessive tension is typically induced in the power cable 700 by extreme weather conditions surrounding the floating structure 600, for example in the event of a 50, 100 or 1000 year storm. Strong ocean waves and currents, brought on by a storm, can cause the power cable 700 to be dragged back and forth from the floating structure 600, storm conditions can also overload the mooring lines 51 or anchor 52. Other factors can cause excessive loading of the cable 700. For example, a collision of another vessel with the floating structure can displace it from its normal location, or the floating structure may lose one or more of its mooring lines. As a result, a high load can be induced in the power cable 700 leading to a potentially hazardous situation. This generally leads to downwards tension in the cable with respect to where the power cable 700 is mounted to the hang-off assembly 500.

Figure 4:
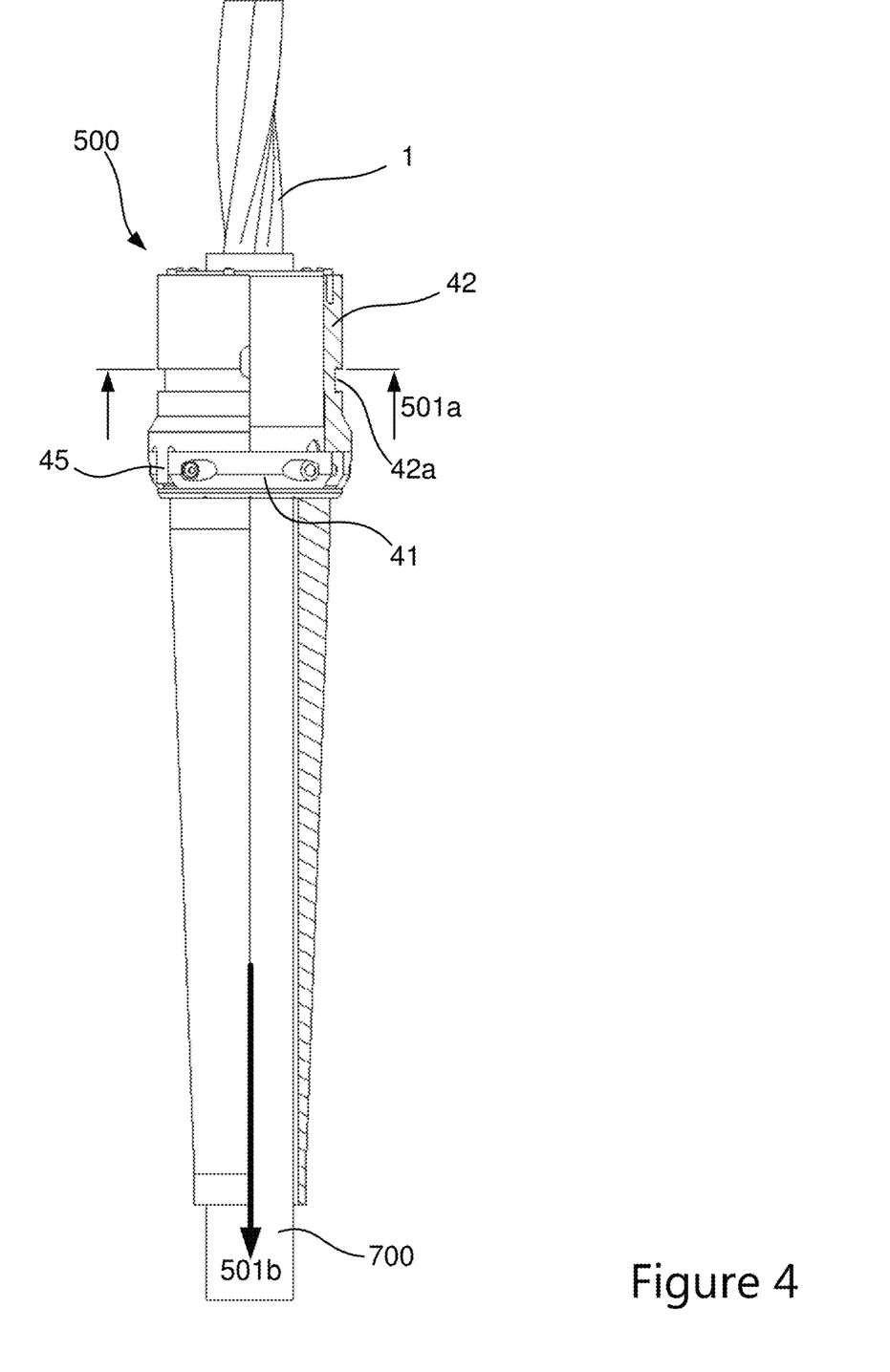
FIG. 4 is a schematic view of a hang-off assembly.

FIG. 4 shows an example hang-off arrangement. The power cable 700 is terminated and supported by the hang-off assembly 500. The hang-off assembly is mounted to the tube 9 using the hang-off groove 42a. The groove extends circumferentially around the outside of the hang-off assembly. The upper part of the tube 9 has a support plate or structure, not shown, with a circular hole provided in it, in which the hang-off assembly rests. The support plate projects into the grove, allowing the upper surface of the groove 42a to rest on the upper edge of the circular hole. In this way, the hang-off assembly 500 "hangs" off the tube 9 via the reaction point 501a. The hang-off assembly comprises a sliding inner portion 41 that is affixed to the fixed outer portion 42 of the hang-off assembly 500 via the shear pins 45. The shear pins 45 are designed to mechanically fail if subjected to a predetermined break-away load. This allows the inner portion 41 to detach from the outer portion 42 and from the hang-off assembly 500.

The power cable 700 is mounted to the inner portion 41 of the hang-off assembly. Tensile stress induced in the power cable 700 is transferred to the pins 45. If the tension in the cable 700 is such that the load transferred to the pins 45 exceeds the predetermined break-away strain required to cause the shear pins 45 to fail, the shear pins 45 fail and allow the power cable 700 and the sliding inner portion 41 to be pulled through the hang-off assembly 500 via the pull-line 501b. This transfers the tension previously supported by the hang-off assembly to the power cable 700 above the hang-off assembly. This causes the load to be transferred to the individual power cores 1, 1', 1" subsequently pulling the respective power cable connectors 300 towards the respective power cable connector breakaway devices 107.

As the power cable connector 300 is drawn downwards, the electrical stress sleeve rim 2c engages the upper lip 113 of the main body 108 and the electrical stress sleeve 2b is forced radially outwards by the tapered section of the main body 108. This separates the electrical stress sleeve 2b from the power core 1 and directs the radially displaced electrical stress sleeve 2b towards the blade edges 111 of the cutting blades (5a, 5a').

The displaced electrical stress sleeve rim 2c now makes contact with the blade edges 111, of the cutting blades (5a, 5a') such that the electrical stress sleeve 2b is cut by the blade edges 111 and becomes bifurcated. Subsequently, as the power core 1 is pulled further through the power cable connector breakaway device 107, the rubber body rim 2d of the power cable connector 300 is drawn towards the main body 108. As before, the rubber body rim 2d is directed towards the blade edges 111 of the cutting blades (5a, 5a') such that they contact one another and the rubber body 2a is cut and bifurcated in the same way as the electrical stress sleeve 2b.

The upper lip 113 of the main body 108 continues to separate the electrical stress sleeve 2b and the rubber body 2a from the power core 1 as the power core 1 is continually pulled through the power cable connector breakaway device 107. The cutting and bifurcation of both the electrical stress sleeve 2b and the rubber body 2a eventually exposes the lug 3a. Depending on the outer dimensions of the lug 3a, either the lower part of the lug 3a or a bearing surface 99 come into engagement with the upper lip 113 of the main body 108.

If the diameter of the lug 3a is smaller than the diameter of the upper lip 113, the upper lip 113 makes contact with the bearing surface 99. Conversely, if the diameter of the lug 3a is larger than the diameter of the upper lip 113, the upper lip 113 makes contact with the lug 3a. In this way, the power cable connector breakaway device 107 is not dependent upon the size of the lug 3a and can operate with a variety of lug sizes. In the arrangement shown in FIG. 5, the lug 3a is narrower than the passage 109 through the main body 108 and can pass into it such that the bearing surface 99 engages the lip 113. However, this assumes that the lug is perfectly centred and, if not, may engage the lip instead of passing into the passage.

In the case where the upper lip 113 makes contact with the bearing surface 99, the movement of the upper part of the power cable connector 300 is prevented inducing a substantial load in the mounting stud 4c, the interface between the cable core 1d and the shear bolt 3b and the conductor core 1d itself. This loading will cause at least one of these components to mechanically fail.

In the case of the upper lip 113 making contact with the lower part of the lug 3a, via reaction point 100, substantial load is induced in the interface between the conductor core 1d and the shear bolt 3b and also in the cable core 1d itself. Again, this loading will cause at least one of these components to mechanically fail.

Generally, the bearing surface 99, or lug 3a, provide a suitable platform for the upper lip 113 of the main body 108 to engage such that a sufficient load is transferred from the power core 1 and into the connecting components of the power cable connector 300, i.e. the shear bolt 3b, the mounting stud 4c etc, such that at least one is caused to fail, to separate the power core 1 from the power cable connector 300.

The action of the cutting blades (5a, 5a') ensures the shock absorbing effect of the electrical stress sleeve 2b and the rubber body 2a of the power cable connector 300 is minimised, by cutting them, such that, for a given load on the power cable 1, the required load on the power cable 1 for causing the connecting components of the power cable connector 300 to fail is greatly reduced.

Cutting the electrical stress sleeve 2b and rubber body 2a aids in exposing the bearing surface 99, or lug 3a, such that a more effective contact event may occur to transfer the load from the power cable 1 to the connecting components. In this way, reducing the load on the power cable 1 required to separate the power core 1 from the connector 300, as outlined above, ensures that the power core 1 is not prevented from being released from the power cable connector 300 when a substantial load is placed upon the power cable 100, preventing the potential localised damage described above.

Where the mounting stud 4c fails, the lug 3a and power core 1 are released from the power cable connector 300 to allow the remaining length of the power core 1 to pass completely through the channel 9 of the main body 108. Similarly, where the shear bolt 3b fails, the failed shear bolt 3b releases the conductor core 1d from the lug 3a, releasing the power core 1 from the power cable connector 300 to allow the remaining length of the power core 1 to pass completely through the channel 109 of the main body 108. If the conductor core 1d itself fails, then the remaining lower part of the conductor core 1d can be pulled through the channel 9 and out of the main body 108.

The sequence for the release of a power core 1 from a power cable connector 300, described above, occurs for each power core 1, 1', 1" that is connected through a respective power cable connector breakaway device 107a, 107b, 107c to a power cable connector 300. By varying the cable length 102 of each power core 1 connected between the corresponding power cable connector 300 and the breakaway device 107, the release of each power core 1 from each power cable connector 300 occurs sequentially in a cascading manner. Releasing the power cores 1 in a cascading manner ensures that the severed ends of each power core 1 can be separated and pulled through the hang-off assembly 500, via a guide funnel 10 in the outer body 42, without becoming entangled. Tangling of the power cores 1 upon release from the power cable connectors 300 can result in the passage of the hang-off assembly 500 becoming obstructed, in which case, the power cable 700 is unable to be released from the floating structure 600, causing localised damage to the tube 9 and/or floating structure 600.

The electrical stress sleeve 2b and rubber body 2a of the power cable connector are typically made of rubber and can therefore provide shock absorbing properties which could act to reduce the peak load induced on the lug 3a and/or bearing surface when rapid and excessive downward load is placed on the power cable 700. Due to this shock absorbing effect, a greater magnitude of tension in the power cable 700 would be required for the shear bolt and/or mounting stud 4c to fail to allow the power cores 1 to be released from the power cable connectors 300. This can result in unwanted, localised damage being done to the tube 9 and/or floating structure 600, which is costly, time-consuming and difficult to repair, often requiring repairs to be done on-shore.

The cutting of the electrical stress sleeve 2b and rubber body 2a, by the cutting blades (5a, 5a'), drastically reduces the shock absorbing ability of the power cable connector 300 once it makes contact with the upper lip 113, and subsequently the main body 108, such that downward movement of the power cable 700, is more likely to successfully release the power cores 1 from the power cable connectors 300 without applying undue load to the rest of the structure and potentially causing damage thereto.

The tapered shape of the main body 108, in conjunction with the cutting and bifurcation of the sleeve 2b and body 2a, allow the sleeve 2b and body 2a to be directed away from the upper lip 113 such that they do not inadvertently catch and bind onto the upper lip 113 and/or main body 108, and inadvertently increase the shock absorbing potential of the power cable connector 300.

The power cable connectors 300 are easier, cheaper and less time-consuming to replace compared to replacing and/or repairing damage done to the tube 9 and/or floating structure 600. In this way, the power cable connector breakaway device 107 allows the power cores 1 to be released from the power cable connectors 300 without damaging the tube 9 and/or floating structure 600.

The released power core ends completely pass through the channel 109 of the power cable connector breakaway device 107 and into the guide funnel 10. The power cable 700 continues to draw the detached inner portion 41 of the hang-off assembly 500 and the released power core ends towards the latch assembly 400 provided below the hang-off assembly 500. The power cable passes through the latch assembly 400 and so as the cable is withdrawn, the inner portion 41 and the released power core ends are pulled towards the passage through the centraliser. Eventually, the inner portion 41 and released power core ends completely clear the outer portion 42 of the hang-off assembly 500, and the inner portion 41 then impacts a centraliser 34 provided at the top of the latch assembly 400 (see FIG. 3).

Figure 3:
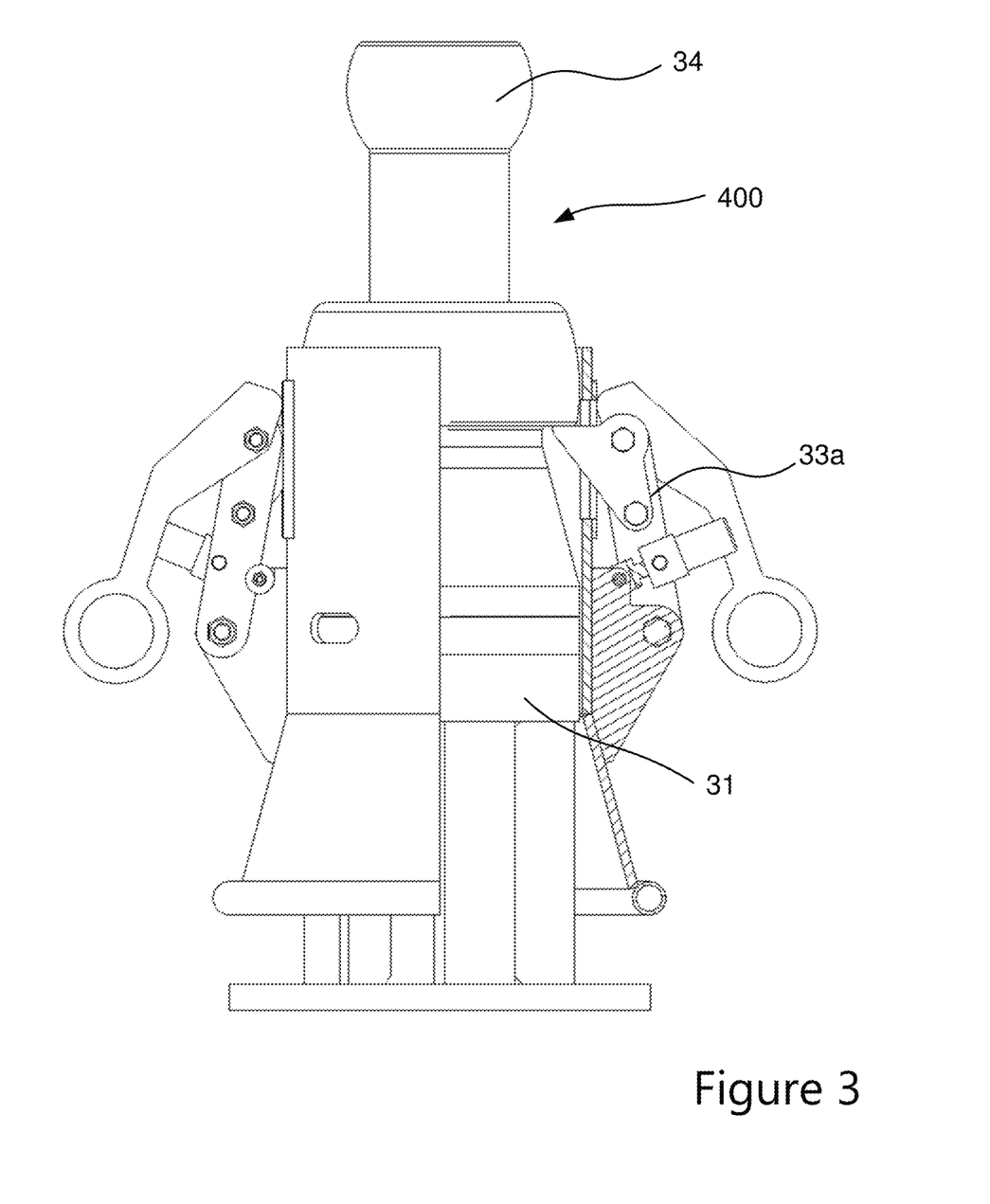
FIG. 3 is a schematic view of a latch assembly.

The latch assembly 400 is attached to the bottom of tube 9 and is remotely engaged during the mounting of the power cable 700, and hang-off assembly 500, see FIG. 3t. The impact of the inner portion 41 with the centraliser 34 causes a locking dog shearing device 33a to mechanically fail. The failing of the locking dog shearing device 33a releases a removable portion of the latch assembly 31 from the tube 9. Subsequently, the power cable 700, removable latch assembly 31, inner body 41 and released power cores 1, 1', 1" are pulled clear of the tube and become free of the floating structure 600.

The process for releasing a power cable 700 from a power cable connector 300 using the power cable connector breakaway device 107 may be carried out, as described above, irrespective of whether the power cable 700 is in an energised or non-energised state whereas previously, a power cable could only be released from a floating structure in a non-energised state. In this way, no planning and/or preparation is required for the disconnection of a power cable 700 from a floating structure 600 using the power cable connector breakaway device 107 allowing for a vastly more flexible and safer power cable release protocol which can be operated in an emergency with no human intervention.

The cutting blades (5a, 5a') may be 'hooked' by further comprising blade hooks 112 which extend upwards, vertically from the end of each upper portion 110, of each cutting blade (5a, 5a'), that is furthest from the main body 108. Here, the blade hooks 112 help in constraining and directing the radially displaced electrical stress sleeve 2b and rubber body 2a onto the blade edges 111. The blade hooks 12 prevent the sleeve 2b and body 2a from passing around and missing the cutting blades (5a, 5a') which may result in an unwanted obstruction of adjacent power cable connector breakaway devices 107 or prevent proper cutting of the rubber body 2a and stress sleeve 2b and thereby potentially reintroducing some of the shock absorbing effect.

The cutting blades (5a, 5a') may further comprise added protection in the form of a low shore hardness polymeric material coating the surface to aid in preventing corrosion of the cutting blade material and to prevent inadvertent cutting or injury to operators during handling. Such coating would not impact the cutting effect of the blades as it would be removed by the abrasive action of the rubber body and stress sleeve passing over it.

In other embodiments, the cutting blades (5a, 5a') may be replaced with any suitably sharp protrusion from the main body 108 such that the sharp protrusion is able to cut the electrical stress sleeve 2b and rubber body 2a upon contact. In other embodiments, the blade edge 111 may not be substantially linear, for example the blade edge 111 may be serrated. The blades may include multiple surfaces or edges.

The main body 108 of the power cable connector breakaway device 107 may function successfully using other types of body shape than cylindrical, for example it may have a hexagonal shape and may not have parallel sides.

As mentioned above, the tapered portion of the main body 108 is shown as having a generally frusto-conical shape but may also have other shapes which preferably have a generally diverging diameter to help in directing the displaced electrical stress sleeve 2b and rubber body 2a towards the blade edges 111 of the cutting blades (5a, 5a') and to cause the ends of the electrical stress sleeve 2b and rubber body 2a to be driven apart to assist in cutting. The main body 108 does not necessarily need to be tapered to function successfully; different types of main body may also function successfully, for example a regular main body may also function successfully. The tapered angle of the tapered main body 108 may vary; it may comprise a single or compound angle, i.e. two or more sections having different single angles to form a progressively tapered angle of the tapered main body 108. Similarly, the cutting edge 111 of the blades (5a, 5a') may also comprise a single or compound angle, e.g. with two or more blade sections arranged at different angles.

Figure 9:
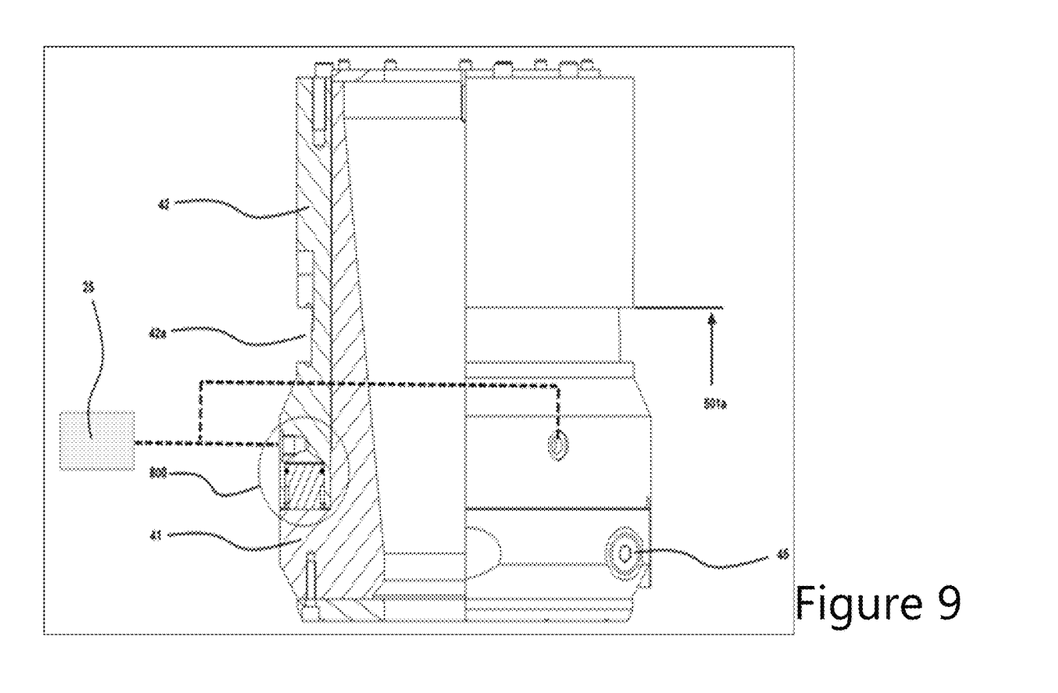
FIG. 9 is magnified schematic view of FIG. 4, showing the remote release device.
Figure 10:
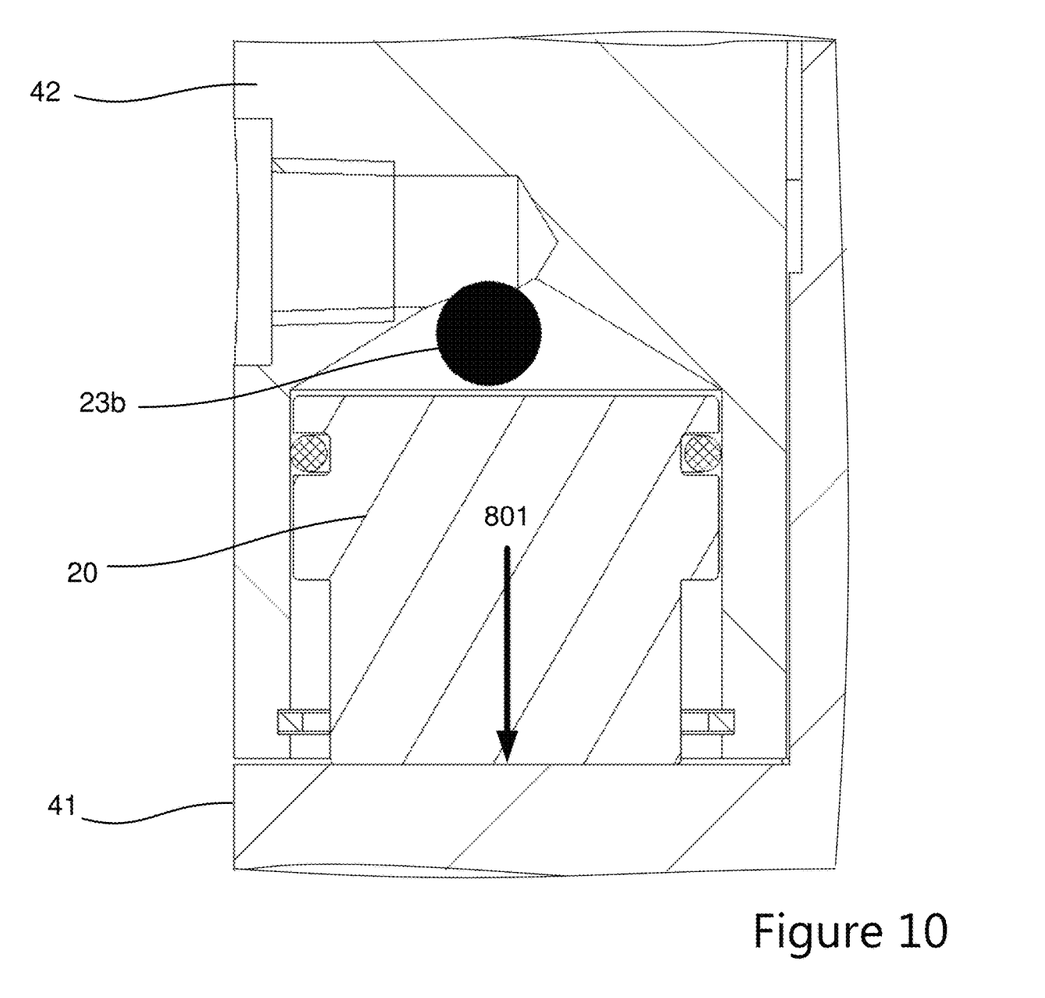
FIG. 10 is a magnified schematic view of the circled portion of FIG. 9, showing the remote release device.

FIG. 9 shows an enlarged version of an alternative configuration of the hang-off assembly 500. FIG. 10 shows a close up of a remote release device 800 shown in FIG. 9. In this embodiment, the shear pins 45 of the hang-off assembly 500 may selectively be caused to fail by way of a remotely controlled load. The power cable 700 can be manually released from the floating structure 600 using the remote release device 800 controlled by a secondary control release system 25, for example, in an emergency, such as before an on-coming storm or impending vessel collision. The pre-emptive ability to release a power cable 700 from a floating structure 600 allows potential damage to the floating structure 600, by an impending dangerous event, to be mitigated as much as possible. It also means that the system does not need to rely on the automatic release mechanism described above which may only operate once the cable and structure is already being put under undesirable loads.

The remotely controlled load may be initiated in a variety of different ways, some examples being, but not limited to, a pre-charged hydraulic accumulator system, reserve power mechanical activator system, explosive charge system or a combination of the different systems. Here, in the case that an explosive change system is used, the remotely controlled load is an explosive charge 23b. When the explosive charge 23b is remotely detonated, the internal plunger 20, of the remote release device 800 is driven in the downwards direction 801 which applies a load between the outer portion 42 and inner body 41 of the hang-off assembly 500. The applied force is greater than the pre-defined break-away strain, required for the shear pins 45 to fail, allowing the inner portion 41 to drop out of the outer portion 42. As described above, once the inner portion 41 is separated from the outer portion 42, the mechanism described above causes the power cable 700 to be released from the floating structure 600. The secondary control release system 25 is self-contained and, once activated, does not require any further remote intervention or power supply to function as intended. The remote activation feature means that the floating structure can be evacuated or be left unmanned whilst still allowing activation of the separation mechanism.

The invention claimed is:

1. A cable breakaway system for use with a power cable connector provided on a power cable, the power cable connector having an outer insulating sheath provided around the outer circumference of at least a part of the connector into which the cable is received, and a bearing surface within the sheath, the cable breakaway system including at least one cable breakaway device comprising:
   a main body having a channel passing therethrough for receiving at least a part of a power cable and an engagement portion provided around the channel at a first end of the cable breakaway device; and
   at least one cutting protrusion extending away from the main body, and having a blade directed in a direction opposite to the first direction, the cutting protrusion having a first portion and a hook portion projecting in a different direction to that of the first portion, the hook portion including a blade,
   the cutting protrusion arranged such that movement of the power cable in a first direction through the channel causes the power cable connector to move towards the first end of the cable breakaway device such that the sheath of the connector engages the at least one cutting protrusion of the breakaway device, cutting the sheath such that it is displaced to pass around the outside of the main body and allowing the bearing surface to move toward and subsequently make contact with said engagement portion preventing relative movement of the power cable connector and the cable breakaway device whilst allowing continued movement of the power cable through the channel such that the cable is separated from the power cable connector.

2. A cable breakaway system according to claim 1, wherein at least part of the main body is cylindrical.

3. A cable breakaway system according to claim 1, wherein at least part of the main body is tapered.

4. A cable breakaway system according to claim 1, wherein the main body is pivotable to allow the channel of the cable breakaway device to be aligned with the power cable upon pulling of the power cable to avoid binding on the main body.

5. A cable breakaway system according to claim 1, wherein at least part of the cutting protrusion is coated with a low shore hardness polymeric material.

6. A cable breakaway system according to claim 1, including a plurality of cutting protrusions arranged around the circumference of the main body.

7. A cable breakaway system according to claim 1, comprising a plurality of cable breakaway devices, a power cable comprising a plurality of power cores and a power cable connector provided at the end of each power core, wherein:
   each power core passes through the channel of a respective cable breakaway device; and
   the length of the power core between each breakaway device and the respective power cable connector is different for each power core, such that as the power cable is pulled, each of the power cable connectors engages the respective cable breakaway device sequentially.

8. A cable breakaway system according to any one of the preceding claims further comprising:
   a hang-off assembly, wherein the hang-off assembly includes a fixed portion for attachment to a structure and a detachable portion for supporting the power cable, wherein the detachable portion is attached to the fixed portion by at least one shear pin, the shear pin being arranged to fail when a load between the fixed portion and the detachable portion exceeds a predetermined value, allowing the fixed portion and the detachable portion to separate.

9. A cable breakaway system according to claim 8 wherein the hang-off assembly is arranged such that separation of the fixed portion and the detachable portion removes a supporting force provided by the fixed portion such that the mechanical load of the cable below the hang-off assembly is transferred to the cable above the hang-off assembly which passes through the one or more cable breakaway devices.

10. A cable breakaway device according to claim 9, further comprising a separation means arranged to provide a separating force between the fixed portion and the detachable portion such that the load between the fixed portion and the detachable portion exceeds a predetermined value.

11. A cable breakaway device according to claim 8, further comprising a separation means arranged to provide a separating force between the fixed portion and the detachable portion such that the load between the fixed portion and the detachable portion exceeds a predetermined value.

12. A cable breakaway device according to claim 11, wherein the separation means includes at least one of: a hydraulic accumulator system, a reserve power mechanical activator system and an explosive charge system.

13. A method for disconnecting a power cable from a power cable connector having a sheath and a bearing surface within the sheath, the method comprising:
   directing at least a portion of the cable through a channel in a cable breakaway device for connection to a power cable connector;
   drawing the cable through the channel in a direction away from the connector, to cause the sheath of the cable connector to engage one or more cutting protrusions, provided on the outer surface of a breakaway device, to cut the sheath such that the sheath is displaced as the cable is drawn;
   further drawing the cable until the sheath is displaced sufficiently to allow the bearing surface to engage the cable breakaway device preventing relative movement of the bearing surface and cable breakaway device; and
   continuing to draw the cable until the cable is separated from the power cable connector.

14. A method according to claim 13, further comprising a hang-off assembly having a fixed portion and a detachable portion connected to and supported by the fixed portion by a shear pin, wherein the power cable is connected to the detachable portion to support the power cable, the method comprising:
   inducing a load between the fixed portion and the detachable portion to cause the shear pin to fail due to the induced load, such that the detachable portion becomes separated from and unsupported by the fixed portion; and
allowing the detachable portion to move away from the fixed portion, drawing the cable through the hang-off assembly such that at least a portion of the cable is drawn through the channel as a result of the load in the cable due to the separation of the detachable portion from the fixed portion.

* * * * *